United States Patent
Pavlov et al.

(10) Patent No.: US 9,369,504 B1
(45) Date of Patent: Jun. 14, 2016

(54) ENABLING SEAMLESS REMOTE ACCESS TO ONLINE APPLICATIONS THROUGH A WEB SERVER

(71) Applicant: Rollapp, Inc., Palo Alto, CA (US)

(72) Inventors: Volodymyr Pavlov, Palo Alto, CA (US); Dmitry Dakhnovsky, Weston, FL (US); Dmytro Malenko, Dnepropetrovsk (UA)

(73) Assignee: rollApp, Inc., Palo Alto, CA (US)

( * ) Notice: Subject to any disclaimer, the term of this patent is extended or adjusted under 35 U.S.C. 154(b) by 374 days.

(21) Appl. No.: 13/652,302

(22) Filed: Oct. 15, 2012

Related U.S. Application Data (60) Provisional application No. 61/553,881, filed on Oct. 31, 2011.

(51) Int. Cl.
H04L 29/06 (2006.01)

(52) U.S. Cl.
CPC .................................... H04L 65/40 (2013.01)

(58) Field of Classification Search
CPC ........ H04L 29/06; H04L 67/025; H04L 65/40
USPC ....................................................... 709/219
See application file for complete search history.

(56) References Cited

U.S. PATENT DOCUMENTS

| | | | | |
|---|---|---|---|---|
| 5,838,916 | A * | 11/1998 | Domenikos et al. | 709/219 |
| 6,489,954 | B1 * | 12/2002 | Powlette | G06F 9/468 345/520 |
| 7,693,962 | B2 * | 4/2010 | Serlet et al. | 709/219 |
| 8,065,423 | B2 * | 11/2011 | Braddy et al. | 709/229 |
| 8,589,481 | B2 * | 11/2013 | Das et al. | 709/203 |
| 8,769,041 | B2 * | 7/2014 | Sato | 709/217 |
| 2008/0218808 | A1 * | 9/2008 | Van Den Berge | 358/403 |
| 2011/0145360 | A1 * | 6/2011 | Sheshagiri et al. | 709/217 |
| 2012/0102103 | A1 * | 4/2012 | Jacobson et al. | 709/204 |
| 2012/0303763 | A1 * | 11/2012 | Duggal | G06Q 10/10 709/219 |
| 2013/0054679 | A1 * | 2/2013 | Jooste | 709/203 |
| 2014/0009474 | A1 * | 1/2014 | Joshi et al. | 345/471 |

* cited by examiner

*Primary Examiner* — Brian J Gillis
*Assistant Examiner* — Steve Lin
(74) *Attorney, Agent, or Firm* — Sheppard, Mullin, Richter & Hampton LLP

(57) ABSTRACT

Matching an appropriate online application for a particular file access is disclosed. In a specific implementation, a seamless remote online application-enabled web page can be served to a web client. In another specific implementation, a script can be injected into a web page to create a seamless remote online application-enabled web page.

19 Claims, 6 Drawing Sheets

ENABLING SEAMLESS REMOTE ACCESS TO ONLINE APPLICATIONS THROUGH A WEB SERVER

CROSS-REFERENCE TO RELATED APPLICATIONS

This application claims priority to U.S. Application Ser. No. 61/553,881, filed Oct. 31, 2011, entitled "ENABLING SEAMLESS REMOTE ACCESS TO ONLINE APPLICATIONS THROUGH A WEB SERVER, which is incorporated by reference.

BACKGROUND

Many computers can be taught how to treat certain files. For example, an operating system (OS) can be told to use a particular word processing application when a user attempts to open a file with an extension ".doc." A system can also display choices, from which a user can choose, to "open with."

In the event the system does not know what to do with a file and no application is available to open the file, a typical approach is to send the user to the web to search for an application that can be used to open the file. If the user is able to find an appropriate application, the user can download the application, install it and instruct the OS that in the future, attempts to open files of the relevant file type should be performed using the new application.

Unfortunately, a user is not able to open a file unless an appropriate application has been downloaded and installed. This can prevent certain files from being opened or slow the user down. Also, if a system that does not have the capability to run the relevant application is used, it may not even be possible for the user to run the application (or the application may run poorly).

The foregoing example of trends and issues is intended to be illustrative and not exclusive. Other limitations of the art will become apparent to those of skill in the relevant art upon a reading of the specification and a study of the drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
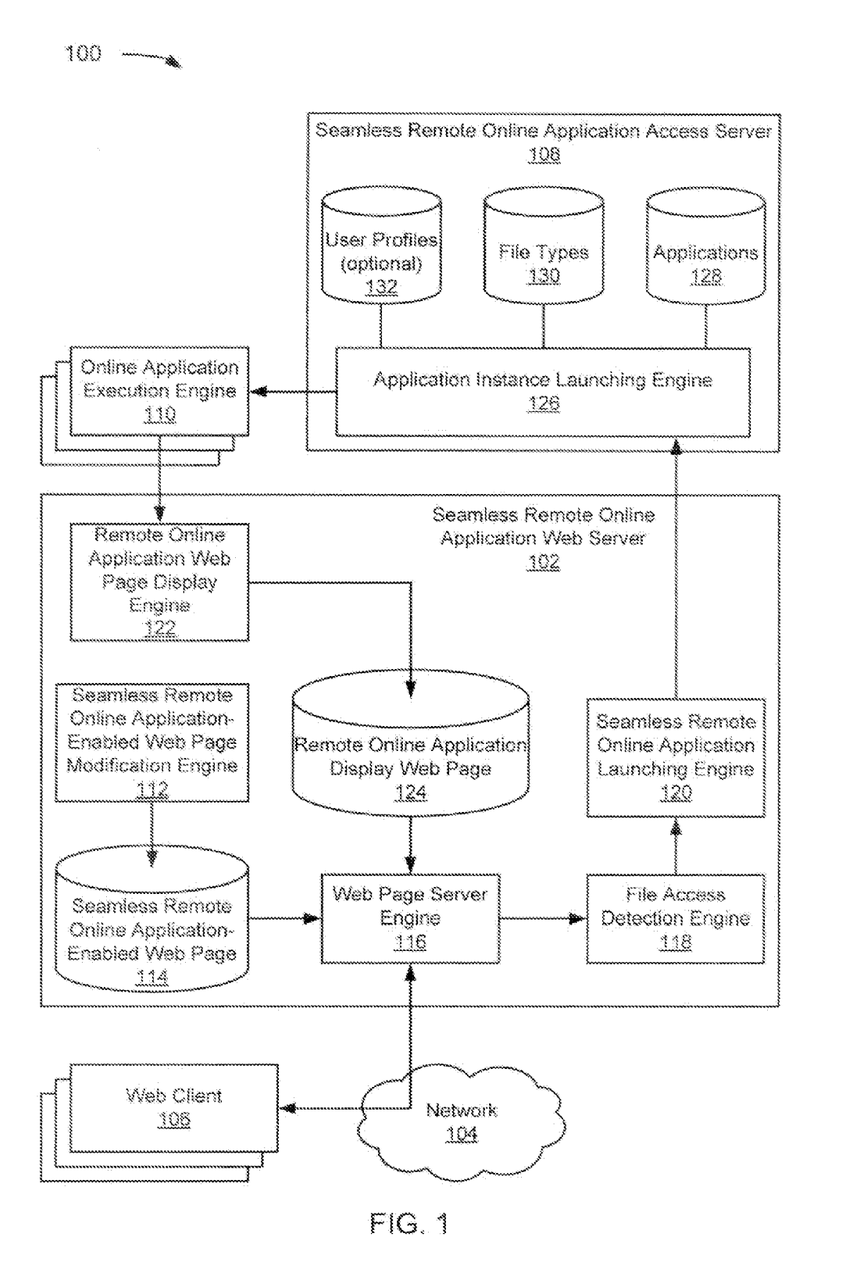
FIG. 1 depicts a diagram of an example of a seamless remote online application access via web server system.

FIG. 1 depicts a diagram of an example of a seamless remote online application access via web server system 100. The system 100 includes a seamless remote online application web server 102, a network 104, a web client 106, a seamless remote online application access server 108, and an online application execution engine 110. The system 100 can include multiple web clients (represented in the example of FIG. 1 as a conceptual "stack" of boxes 106). The system 100 can include multiple online application execution engines (represented in the example of FIG. 1 as a conceptual "stack" of boxes 110), a subset of which may or may not be local or remote relative to the seamless remote online application access server 108, the seamless remote online application web server 102, and/or local or remote relative to one another.

In the example of FIG. 1, the seamless remote online application web server 102 includes a seamless remote online application-enabled web page modification engine 112, a seamless remote online application-enabled web page datastore 114, a web page server engine 116, a file access detection engine 118, a seamless remote online application launching engine 120, a remote online application web page display engine 122, and a remote online application display web page datastore 124.

In the example of FIG. 1, the seamless remote online application-enabled web page modification engine 112 is illustrated as part of the seamless remote online application web server 102. However, depending upon the implementation, the engine can be implemented remote relative to the seamless remote online application web server. In general, the purpose of the seamless remote online application-enabled web page modification engine 112 is to modify, create, render, or otherwise generate a web page that includes a seamless remote online application functionality that is triggered when a file access on the web page is detected. The seamless remote online application-enabled web page can be created in advance and stored for later use, dynamically in accordance with member-specific parameters when the web page is requested by a member, dynamically in accordance with a plug-in of a web client, or in some other manner that takes into account the desired functionality. For example, a seamless remote online application-enabled web page could be modified specifically in accordance with subscriber preferences, such as to associate particular file types with particular applications. As another example, a seamless remote online application-enabled web page could be created in a manner that is different in a first jurisdiction as opposed to that of a second jurisdiction (e.g., due to trademark ownership requirements in the first or second jurisdiction). As another example, a seamless remote online application-enabled web page could be created in a manner that depends upon the available resources at a server (e.g., a default seamless remote online application-enabled web page could be used when resources are scarce, and a customized default seamless remote online application-enabled web page could be used when resources are available). The seamless remote online application-enabled web page modification engine 112 can modify a pre-existing web page or web page template such that files represented in the web page can be accessed using a seamless remote online application when selected.

In operation, the seamless remote online application-enabled web page modification engine 112 modifies a web page by injecting a script (and/or a specific code) into the web page. The script is executed in, e.g., a web browser when the web page is launched. The script (code) augments a link to a file to enable seamlessly opening the file with a remote online application. In a specific implementation, the script (code) retrieves a list of remote online applications capable of opening files having the file type of the file for which the file link is augmented and, optionally, designates one of the remote online applications of the list as a default application (i.e., the application that is launched when the file is selected, unless some other application is explicitly selected). When a file access request is detected (e.g., by detecting that a user has clicked on the link associated with the file on the web page), the default (or selected, if applicable) remote online application is launched. If the list of files includes zero remote online applications, the link may or may not be augmented. If the list of files includes one remote online application, it will be the default. In some implementations, the list may be limited to one (or limited to one for users who do not meet certain criteria, such as a paid license to use a specific remote online application).

In a specific implementation, the script also retrieves information about a subscriber (e.g., the subscriber associated with the client viewing the web page), data associated with the client, and/or environmental conditions at the web server, the network, or other applicable location. The link can be augmented in accordance with subscriber-specific (assuming the client can be associated with a subscriber), environment-specific or other conditions. For example, a subscriber could preselect a default application for certain file types, the owner of the web server might choose to only augment links for users that meet certain criteria or when network resources are sufficient to handle the load, the owner of the seamless remote online application access server might limit the number of augmented links to keep the instances of remote online applications to a certain number, or the like. Even if certain conditions are not met, the link could still be augmented to enable alternative seamless remote online application solutions, such as those for which a license is not needed.

As used in this paper, an engine includes a dedicated or shared processor and, typically, firmware or software modules that are executed by the processor. Depending upon implementation-specific or other considerations, an engine can be centralized or its functionality distributed. An engine can include special purpose hardware, firmware, or software embodied in a computer-readable medium for execution by the processor. As used in this paper, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The seamless remote online application-enabled web page datastore 114 includes a set of seamless remote online application-enabled web pages from the seamless remote online application-enabled web page modification engine 112. The seamless remote online application web server 106 will likely also be able to serve web pages that are not seamless remote online application-enabled, which can be stored in a web page datastore (not shown), the contents of which can be considered a superset of seamless remote online application-enabled web pages in the seamless remote online application-enabled web page datastore 114.

A datastore can be implemented, for example, as software embodied in a physical computer-readable medium on a general- or specific-purpose machine, in firmware, in hardware, in a combination thereof, or in an applicable known or convenient device or system. Datastores in this paper are intended to include any organization of data, including tables, comma-separated values (CSV) files, traditional databases (e.g., SQL), or other applicable known or convenient organizational formats. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure.

In the example of FIG. 1, the web page server engine 116 can serve a web page, such as a seamless remote online application-enabled web page from the seamless remote online application-enabled web page datastore 114. When serving such a web page, the web page server engine 116 can be referred to as a seamless remote online application-enabled web page server. The web page server engine 116 is configured to resolve client input received at the web page server engine 116 in an appropriate manner.

In the example of FIG. 1, the file access detection engine 118 detects an attempt to access a file represented on a seamless remote online application-enabled web page served by the web page server engine 116. Depending upon the configuration, the file access detection engine 118 can facilitate a download of the file (a download engine is not illustrated) or trigger the seamless remote online application launching engine 120. Advantageously, triggering the seamless remote online application launching engine 120 enables the file access to be handled by an application that is not locally available at the seamless remote online application web server 102 or the web client 106, without installing the application on the seamless remote online application web server 102 or the web client 106. Moreover, the experience (from the perspective of a user of the web client 106) is seamless because output of the remote online application can be provided through a web browser (either in the same window as displayed the seamless remote online application-enabled web page or in a new window). Because the application is remote and online, the seamless remote online application web server 102 and the client 106 need not use resources to run the application, waste time downloading/installing the application, waste time configuring an application for execution on the server or client, etc.

In the example of FIG. 1, the remote online application web page display engine 122 receives output from the remote online application launched by the seamless remote online application launching engine 120 and stores a remote online application display web page in the remote online application display web page datastore 124. The web page server engine 116 can serve the remote online application display web page to a web browser at the web client 108. When serving such a web page, the web page server engine 116 can be referred to as a remote online application display web page server.

In the example of FIG. 1, the network 104 can include one or more networks, such as a local area network (LAN), wireless LAN, cellular network, the Internet, or some other network. One network of particular interest for an online application service is the World Wide Web ("the Web"), which is one of the services that runs on the Internet. The Web is a system of interlinked hypertext documents accessed via the Internet. With a web browser, one can view web pages that can contain text, images, videos, and other multimedia and navigate between the web pages via hyperlinks.

Wireless networks will typically include an internetworking unit (IWU) that interconnects wireless devices on the relevant one of the wireless networks with another network, such as a wired LAN. The IWU is sometimes referred to as a wireless access point (WAP). In the IEEE 802.11 standard, a WAP is also defined as a station. Thus, a station can be a non-WAP station or a WAP station. In a cellular network, the WAP is often referred to as a base station. Wireless networks can be implemented using any applicable technology, which can differ by network type or in other ways. The wireless networks can be of any appropriate size (e.g., metropolitan area network (MAN), personal area network (PAN), etc.). Broadband wireless MANs may or may not be compliant with IEEE 802.16, which is incorporated by reference. Wireless PANs may or may not be compliant with IEEE 802.15, which is incorporated by reference. The wireless networks 2404 can be identifiable by network type (e.g., 2G, 3G, WiFi), service provider, WAP/base station identifier (e.g., WiFi SSID, base station and sector ID), geographic location, or other identification criteria. The wireless networks may or may not be coupled together via an intermediate network. The intermediate network can include practically any type of communications network, such as, by way of example but not limitation, the Internet, a public switched telephone network (PSTN), or an infrastructure network (e.g., private LAN). The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (the web).

A device on which the seamless remote online application web server 102 (and other applicable components of FIG. 1) is implemented can be implemented as a station. A station, as used herein, may be referred to as a device with a media access control (MAC) address and a physical layer (PHY) interface to the wireless medium that comply with, e.g., the IEEE 802.11 standard. A station can be described as "IEEE 802.11-compliant" when compliance with the IEEE 802.11 standard is intended to be explicit. (I.e, a device acts as described in at least a portion of the IEEE 802.11 standard.) One of ordinary skill in the relevant art would understand what the IEEE 802.11 standard comprises today and that the IEEE 802.11 standard can change over time, and would be expected to apply techniques described in this paper in compliance with future versions of the IEEE 802.11 standard if an applicable change is made. IEEE Std 802.11™-2007 (Revision of IEEE Std 802.11-1999) is incorporated by reference. IEEE 802.11k-2008, IEEE 802.11n-2009, IEEE 802.11p-2010, IEEE 802.11r-2008, IEEE 802.11w-2009, and IEEE 802.11y-2008 are also incorporated by reference.

In alternative embodiments, one or more wireless devices may comply with some other standard or no standard at all, and may have different interfaces to a wireless or other medium. It should be noted that not all standards refer to wireless devices as "stations," but where the term is used in this paper, it should be understood that an analogous unit will be present on all applicable wireless networks. Thus, use of the term "station" should not be construed as limiting the scope of an embodiment that describes wireless devices as stations to a standard that explicitly uses the term, unless such a limitation is appropriate in the context of the discussion.

In the example of FIG. 1, the web client 106 is coupled through the network 104 to the seamless remote online application web server 102. The web client 106 can be implemented on an applicable known or convenient user device, such as a smart phone, personal computer, or other computing device. Some aspects of the functionality of the web client 106 can be accomplished by installing a launcher on a user device, installing a shortcut with an application-specific launcher on the user device, installing a browser plug-in in the user device, installing a launcher on a third party web server, or the like, described in more detail below. Depending upon the context, the web client 106 can include a user device (e.g., a user's computer) or can be limited to an engine on the user device.

The web client 106 can include a web browser engine (not shown) and input and output devices suitable for use with a web browser. The web client 106 may or may not also include an operating system. An operating system is a set of programs that manage computer hardware resources, and provides common services for application software. The operating system enables an application to run on a computer, whereas only applications that are self-booting can generally run on a computer that does not have an operating system. Operating systems are found in almost any device that includes a computer (e.g., cellular phones, video game consoles, web servers, etc.). Examples of popular modern operating systems are Linux, Android, iOS, Mac OS X, and Microsoft Windows®. Embedded operating systems are designed to operate on small machines like PDAs with less autonomy (Windows CE and Minix 3 are some examples of embedded operating systems). Operating systems can be distributed, which makes a group of independent computers act in some respects like a single computer. Operating systems often include a kernel, which controls low-level processes that most users cannot see (e.g., how memory is read and written, the order in which processes are executed, how information is received and sent by I/O devices, and devices how to interpret information received from networks). Operating systems often include a user interface that interacts with a user directly to enable control and use of programs. The user interface can be graphical with icons and a desktop or textual with a command line. Application programming interfaces (APIs) provide services and code libraries. Which features are considered part of the operating system is defined differently in various operating systems, but all of the components are treated as part of the operating system in this paper for illustrative convenience.

In operation, a user of the web client 106 interacts with the seamless remote online application-enabled web page. The user can select a file represented in the seamless remote online application-enabled web page. Depending upon the implementation, it may or may not be possible to take other actions associated with the file (e.g., download or "open with"). When the seamless remote online application is launched by selecting a file in a web browser, output of the remote online application can optionally be displayed in the web browser or another window of the web browser.

Advantageously, the seamless remote online application-enabled web page can eliminate the need for a powerful device because the application is running in the cloud. Users need not worry about having a particular application for a particular operating system (e.g., a user does not need a special program to run a Windows-compatible application, such as Word, on a Mac; a user can launch an iPhone app on an Android device; etc.). Users need not worry about software becoming obsolete because a remote online application can be used to run any executable file, regardless of whether the file is currently executable on the user's device; legacy platforms can run on any device.

In the example of FIG. 1, the seamless remote online application access server 108 includes an application instance launching engine 126, an applications datastore 128, a file types datastore 130, and an optional user profiles datastore 132. The seamless remote online application access server 108 can be implemented on an applicable known or convenient computing device. Some aspects of the functionality of the seamless remote online application access server 108 can be accomplished by launching an instance of an application within the private network of the server, launching an instance of an application on a third party server, storing file components only in random access memory (RAM) as opposed to non-volatile (NV) storage, transferring files on the web to server components without downloading to a client, transferring files on a client device to the web for operation (with or without permanent storage), or the like. These aspects will be described in more detail below. Depending upon the context, the seamless remote online application access server 106 can include a server computer or can be limited to an engine on the server computer.

In the example of FIG. 1, the application instance launching engine 126 receives an indication from the seamless remote online application launching engine 120 for an application that can handle a file associated with a file access request. The request can be initiated by a browser plug-in and sent from the web client 106, or the request could be initiated at the seamless remote online application web server 102 upon receipt of a file access request.

In the example of FIG. 1, the applications datastore 128 includes applications data structures for applications that are known to the seamless remote online application access server 108. The applications can become known by receiving application installation (or execution) modules from application providers. The application installation/execution modules may or may not be stored in the applications datastore 128. If the application installation/execution modules are stored in a network under the control of the same entity as controls the seamless remote online application access server 108, the application installation/execution modules can be referred to as stored in the applications datastore 128 or locally relative to a private network. Applications installation/execution modules that are stored in a network not under the control of the same entity as controls the seamless remote online application access server 108 can be referred to as stored remotely or remotely relative to a private network. Regardless of the storage location of the application modules, data structures in the applications datastore 128 identify applications that the online application instance launching engine 126 can launch (or activate, or pass control to).

In the example of FIG. 1, the file types datastore 130 includes file type data structures for file types of files that applications identifiable in the applications datastore 128 are capable of handling. A common way of identifying a file by its file type is by considering its extension, but this is not the only way. A known or convenient technique for identifying a file by file type can be used in addition or instead.

In the example of FIG. 1, the user profiles datastore 132 includes user profile data structures for users who are members or subscribers to the seamless remote online application service. The user profiles datastore 132 can be considered optional because it is not necessarily the case that a user will subscribe to the service, explicitly become a member, or take some action other than click on a file in a web page. If user profile data is maintained, a subscriber can set preferences, such as preferences for which application should be used to handle a file having a particular file type. User profile data can also facilitate arrangement of subscribers into relevant groups. For example, the seamless remote online application access server 108 can set a default application for use in archiving files that is based on the nationality of a subscriber because it is relatively well-known that Russian subscribers prefer to use WinRAR, while US-based users prefer WinZIP.

In operation, the application instance launching engine 126 receives at least an identification of a file. The application instance launching engine 126 consults the user profiles datastore 132 (if applicable) to determine whether files having the relevant file type have a user-specific (or user group-specific) default application in the applications datastore 128 that is used to handle the file. If there is no user-specific default, the application instance launching engine 126 can instead use a global default application from the applications datastore 128 that is identifiable in association with the relevant file type in the file types datastore 130. Alternatively or in addition, the application instance launching engine 126 could query a user regarding preferences if an appropriate application is not identifiable for the file access request. The query could include, for example, a list of applications from which the user can select one, a form that helps the seamless remote online application access server 108 identify the file type, a form that helps track how popular unrepresented file types are for the purpose of expanding the applications datastore 128, or the like.

In the example of FIG. 1, the application instance launching engine 126 launches (or activates, or passes control to) an instance of the relevant application at the online application execution engine 110. The online application execution engine 110 can be implemented within the seamless remote online application access server 108, within a network under control of the same entity as controls the seamless remote online application access server 108, or at the seamless remote online application web server 102. The online application execution engine 110 can be tied to a web site offering of the seamless remote online application web server 102, such as web-based email that can open attachments within a web browser or a document management site that enables unrestrictive storage of files by file type and the ability to handle file access requests for the various file types within a web browser. The seamless remote online application web server 102 need not actually manage the application instances, however, if application instances are managed locally relative to the private network of the seamless remote online application access server 108 or by a third party service provider (not shown).

In the example of FIG. 1, the online application execution engine 110 can trigger the remote online application web page display engine 122 to modify a web page in accordance with output of the executed application. While there are undoubtedly a great many implementations for which display of output is desired, it is not strictly the case that an instantiation of an application will result in the need to display anything at a requesting device. For example, the launch of a remote online application could be initiated at a first device and displayed on a second device. As such, the remote online application display web page need not be provided to the same web client 106 that initiated the seamless remote application instance launch (or any web client, for that matter).

Figure 2:
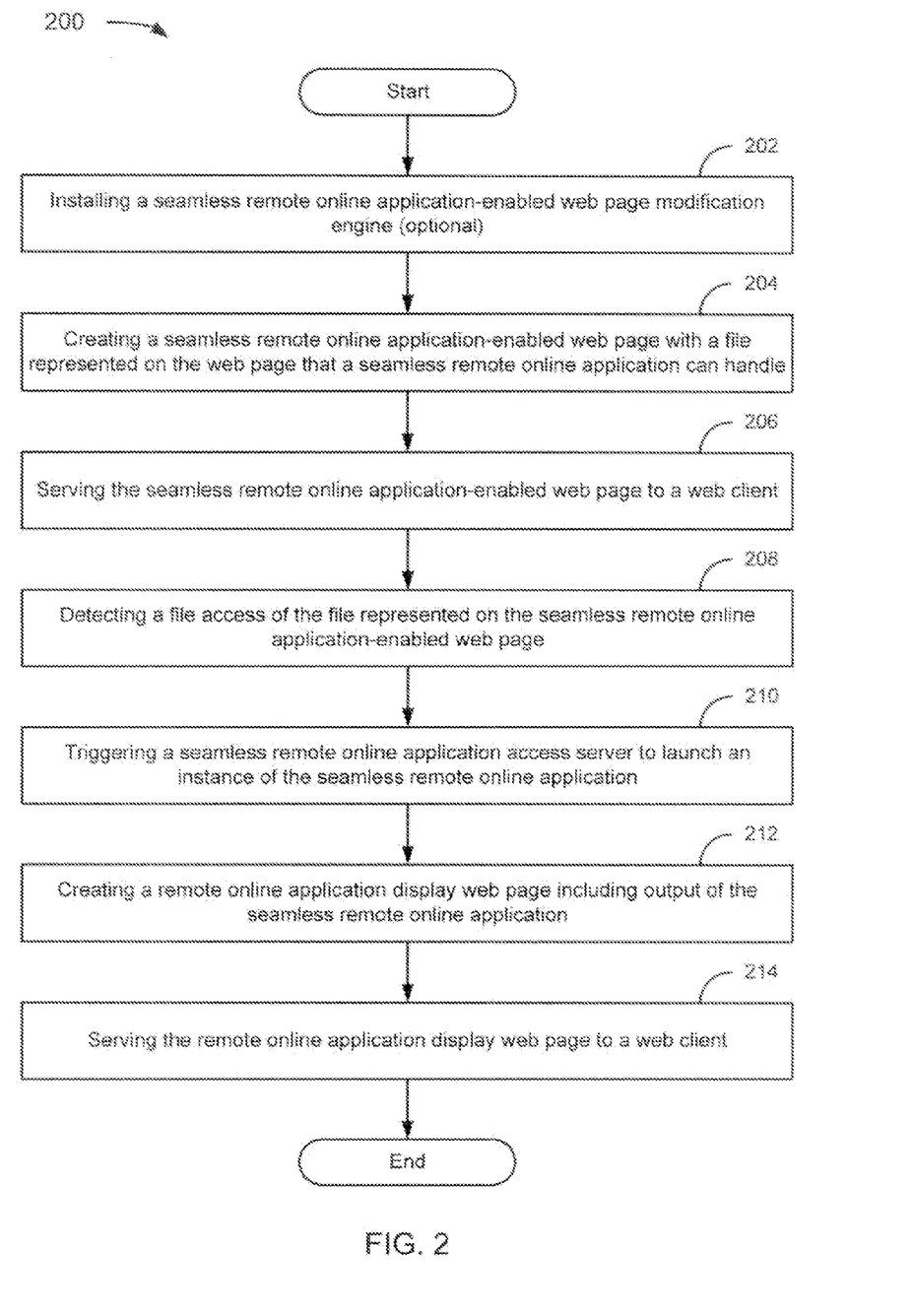
FIG. 2 depicts a flowchart of an example of a method for web server-side seamless remote online application access.

FIG. 2 depicts a flowchart 200 of an example of a method for web server-side seamless remote online application access through a web server. In some implementations, the modules of the flowchart 200 and other flowcharts described in this paper are reordered to a permutation of the illustrated order of modules or reorganized for parallel execution. In the example of FIG. 2, the flowchart 200 starts at module 202 with installing a seamless remote online application-enabled web page modification engine. The module 202 is optional because a web server could be programmed to include the functionality without an additional add-on. As such, the web server could create a web page rather than modifying a first web page to create a second web page.

In the example of FIG. 2, the flowchart 200 continues to module 204 with creating a seamless remote online application-enabled web page with a file represented on the web page that a seamless remote online application can handle. The web page may or may not provide an indicia, such as an icon, that the file can be handled by the seamless remote online application. The indicia can indicate what application will be used to open the file. Where the seamless remote online application is launched through a universal launcher, any or all (e.g., including unknown file types) or a subset of all file types can be associated with the indicia. Multiple different identifiable remote online applications may or may not be capable of handling a given file, which can be determined later based upon environmental conditions, subscriber preferences, or other variables. Because a specific implementation can have a huge number of remote online applications capable of handling a given file, it may be desirable to limit the indicia, but at least in theory it may be possible to identify all available remote online applications on a seamless remote online application-enabled web page.

In the example of FIG. 2, the flowchart 200 continues to module 206 with serving the seamless remote online application-enabled web page to a web client. The functionality may or may not be available only if the web client includes a browser plug-in, is identified as a subscriber of a service for which the functionality is enabled, or under other specific conditions. The web page may or may not also enable download of the file to a web client in lieu of or in addition to launching the seamless remote online application to handle the file.

In the example of FIG. 2, the flowchart 200 continues to module 208 with detecting a file access of the file represented on the seamless remote online application-enabled web page. One way to attempt a file access is to click on a hypertext link representative of the file. A browser can capture the relevant input from the user and provide the data to the web server, which can use the data to detect the file access. Generally, a file access request can be characterized as an attempt to open, execute, or otherwise access a file, and detection of the file access request is when the web server recognizes that the file access request was made.

In the example of FIG. 2, the flowchart 200 continues to module 210 with triggering a seamless remote online application access server to launch (or activate, or pass control to) an instance of the seamless remote online application. This entails making the file available to a remote online application capable of handling with the requested file. An application must typically be designed to handle particular file types. In some cases, file types are sufficiently similar that some degree of handling is possible with applications that are not specifically designed to handle a particular file type. (E.g., an application designed to handle only .txt might be able to make some sense of a .rtf file.) As used in this paper, if a human or artificial agent can make use of a file in the manner intended for the file (e.g., text for text documents, multimedia for multimedia documents) when using a particular application, that application can handle that file.

In the example of FIG. 2, the flowchart 200 continues to module 212 with creating a remote online application display web page including output of the seamless remote online application. Although applications frequently provide output for display, this module is, strictly speaking, optional.

In the example of FIG. 2, the flowchart 200 ends at module 214 with serving the remote online application display web page to a web client. The web client may or may not be the same web client to which the seamless remote online application-enabled web page was served (206). In a specific implementation, output of the remote online application is delivered to a user through a browser window. When the browser window is closed, the instance of the remote online application may or may not end. For example, a user could close a browser on a smart phone and open a browser on a desktop computer to access the instance of the application. The amount of time the instance remains alive can depend upon implementation- and/or configuration-specific considerations, such as a default setting, paid vs. free service, or the like.

Figure 3:
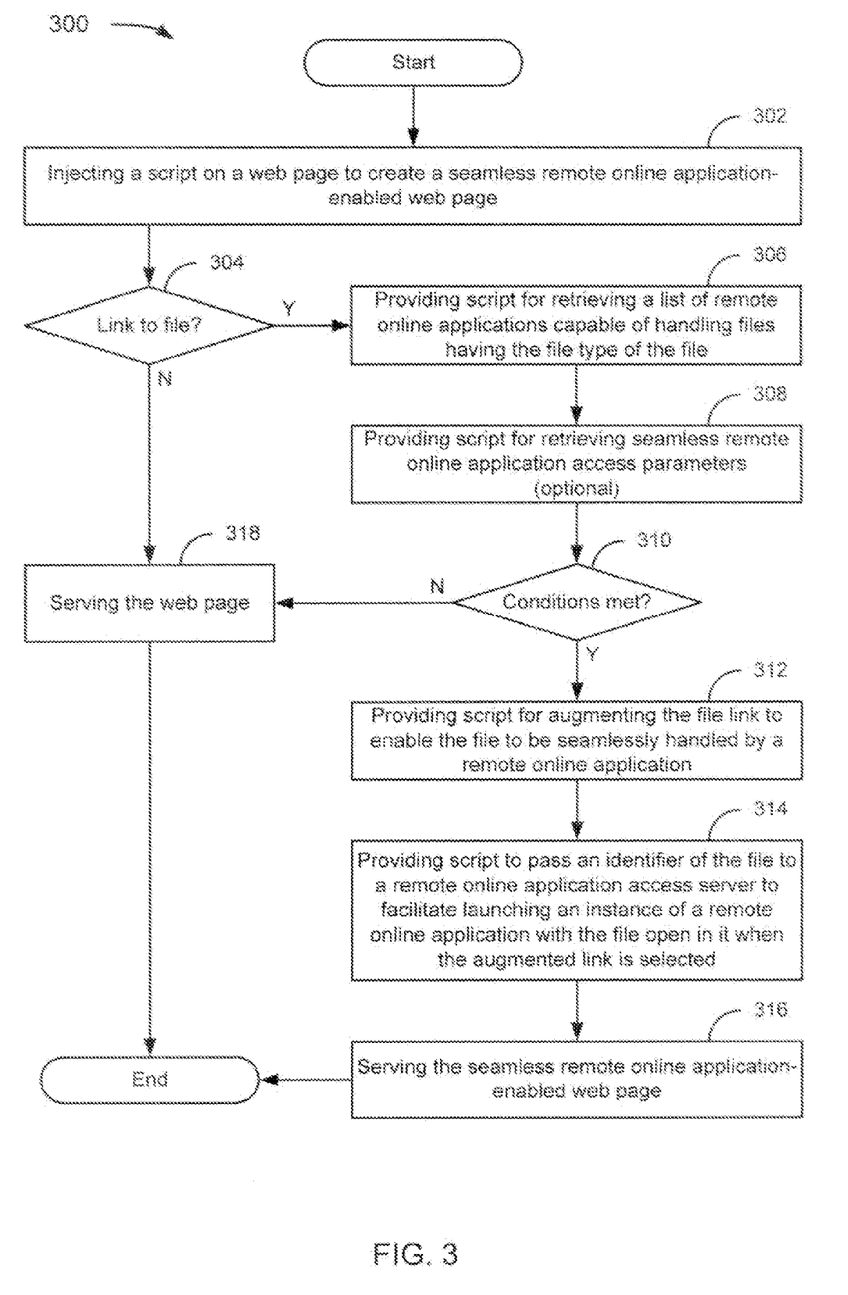
FIG. 3 depicts a flowchart of an example of a method for implementing a seamless remote online application-enabled web page.

FIG. 3 depicts a flowchart 300 of an example of a method for implementing a seamless remote online application-enabled web page. FIG. 3 is intended to illustrate primarily the creation of a seamless remote online application-enabled web page as is described with reference to module 202 of the example of FIG. 2, but includes somewhat more discussion regarding the use of the web page, as well.

In the example of FIG. 3, the flowchart 300 starts at module 302 with injecting a script on a web page to create a seamless remote online application-enabled web page. Before injecting the script, the web page may or may not be a preexisting web page that is not seamless remote online application-enabled. After injecting the script, the web page can be referred to as a seamless remote online application-enabled web page. It may be noted that a seamless remote online application-enabled web page may or may not enable seamless remote online application access for all users and under all circumstances, but will enable seamless remote online application access for at least one user and/or under at least one circumstance. For example, a seamless remote online application-enabled web site can enable a subscriber to a particular service to seamlessly access a remote online application when clicking on a file link, but not allow non-subscribers. As another example, a seamless remote online application-enabled web site can enable a user to seamlessly access a remote online application when resource consumption is below a utility threshold, but disallow users when the resource consumption reaches the utility threshold.

In the example of FIG. 3, the flowchart 300 continues to decision point 304 with determining whether the seamless remote online application-enabled web page includes a link to a file. As is well-known to those of skill in the relevant art, a file has a file type. It is possible for a web server to put off the identification of an unknown file type for resolution at a seamless remote online application access server, which may or may not be able to handle the file. However, from the perspective of the web server, a file having an unknown file type can include script for seamlessly handling the file with a perhaps unidentified remote online application. Thus, a web page with a link to a file having an unknown file type can be seamless remote online application-enabled.

If it is determined that the seamless remote online application-enabled web page includes a link to a file (304-Y), then the flowchart 300 continues to module 306 with providing script for retrieving a list of remote online applications capable of handling files having the file type. The script injected on a web page at module 302 can comprise the script for retrieving a list of remote online applications capable of handling files having the file type.

In the example of FIG. 3, the flowchart 300 continues to module 308 with providing script for retrieving seamless remote online application access parameters. Seamless remote online application access parameters can include data associated with user-specific conditions, environmental conditions, file type-specific conditions, or the like. User-specific conditions can include preferences from a subscriber datastore, user location, user subscriptions, to name a few. Environmental conditions can include network congestion, processing resource utilization, time of day, to name a few. It is possible to provide a seamless remote online application-enabled web page that retrieves a list of remote online applications without considering user-specific and/or environmental conditions, making module 308 optional depending upon implementation and/or configuration. The script injected on a web page at module 302 can comprise the script for retrieving information about user-specific or environmental conditions.

In the example of FIG. 3, the flowchart 300 continues to decision point 310 with determining whether conditions are met. In a specific implementation, if conditions are not relevant (e.g., optional remote module 308 is excluded), it will always be determined at decision point 310 that conditions are met. Meeting conditions can be characterized as matching a conditional value to a seamless remote online application access parameter value or determining that a conditional threshold has been reached by a seamless remote online application access parameter value. For example, a condition could be that a seamless remote online application access parameter value is matched to a conditional value of "subscriber." In this example, a user of a web client can be identified as a subscriber and seamless remote online application access can be granted to the user. As another example, a condition could be that a seamless remote application access parameter value reaches or exceeds a conditional threshold of "90% of processor resources utilized." In this example, the web server can determine that processor resources at a remote online application instance launching engine are insufficient to grant seamless remote online application access to a client.

If it is determined that conditions are met (310-Y), then the flowchart 300 continues to module 312 with providing script for augmenting the file link to enable the file to be seamlessly handled by a remote online application. The augmented file link can enable a user to select from the list of remote online applications retrieved at module 306 (or use a default application from the list) or a remote online application retrieved at module 306 can be selected in accordance with user-specific or environmental conditions. It is possible for first conditions to be met for a first file link and second conditions not be met for a second file link. For the purpose of flow in the flowchart 300, if any condition is sufficient to merit a file link being augmented to enable seamless remote online application access, decision point 310 is satisfied.

In the example of FIG. 3, the flowchart 300 continues to module 314 with providing script to pass an identifier of the file to a remote online application access server to facilitate launching an instance of a remote online application with the file open in it when the augmented link is selected. Users often select links with a mouse click, but any applicable technique for selecting a link can be enabled by a relevant input and/or selection engine. At this point, a seamless remote online application-enabled web page has been created, which can be served by a web server.

In the example of FIG. 3, the flowchart 300 ends at module 316 with serving the seamless remote online application-enabled web page. For a properly configured client, execution of the script is automatic. The seamless remote online application-enabled web page can be stored and served repeatedly or dynamically created each time the web page is requested.

Returning to decision point 310, if it is determined that the conditions are not met (310-N), then the flowchart 300 ends at module 318 with serving the web page. Under certain circumstances, script might be added even if the conditions are not met. In any case, a web page for which the augmented link does not include script for augmenting the file link to enable the file to be handled by a remote online application would not be characterized as seamless remote online application-enabled. The web page can be stored and served repeatedly or dynamically created each time the web page is requested. When the web page is dynamically created, the conditions may or may not be met each time, which results in the flowchart 300 continuing from decision point 310 as appropriate.

Returning to decision point 304, if it is determined that there is no link to a file (304-N), then the flowchart 300 ends at module 318 with serving the web page. Under certain circumstances, script might be added even if there are no file links. In any case, a web page with no file links cannot properly be characterized as seamless remote online application-enabled.

Figure 4:
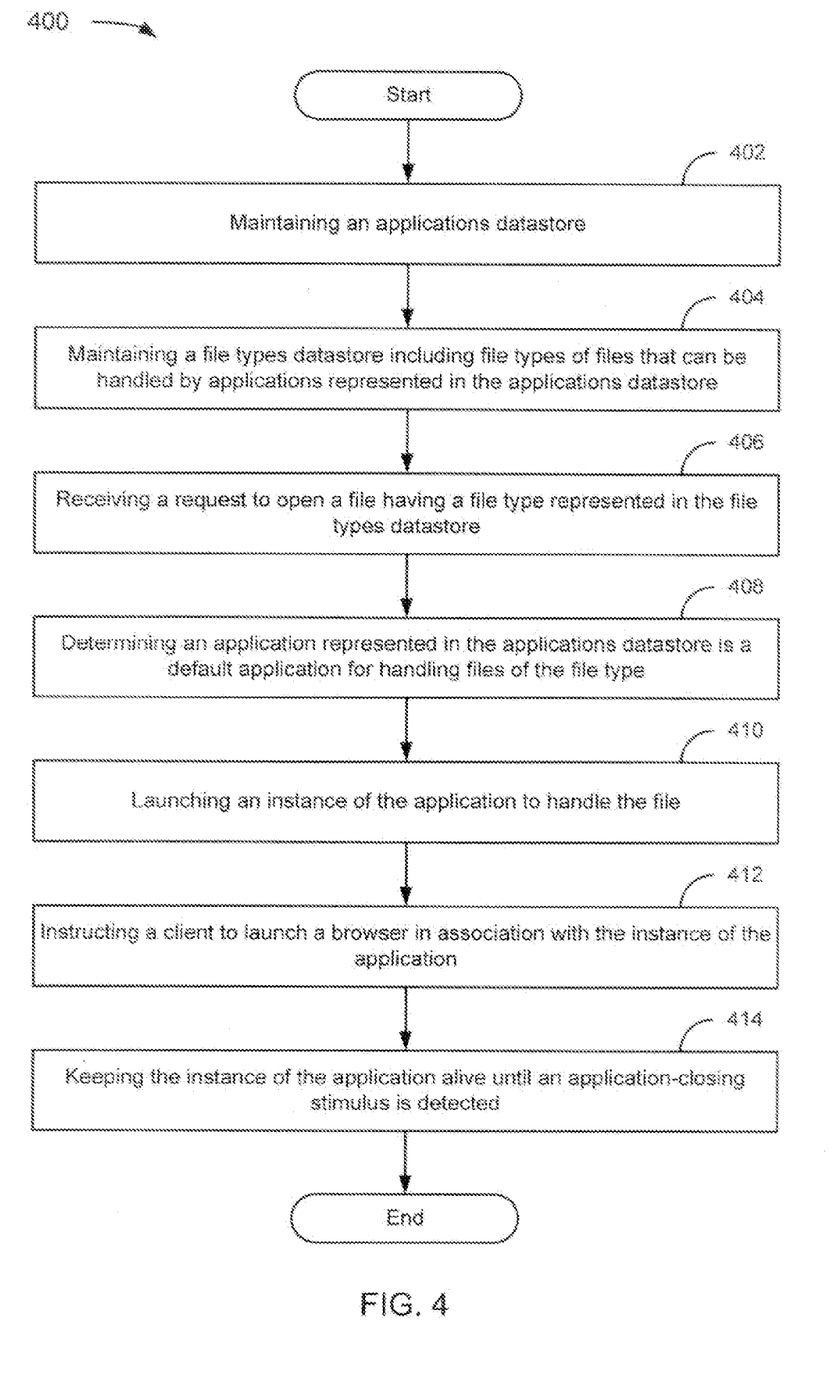
FIG. 4 depicts a flowchart of an example of a method for application server-side seamless remote online application access.

FIG. 4 depicts a flowchart 400 of an example of a method for application server-side seamless remote online application access. In the example of FIG. 4, the flowchart 400 starts at module 402 with maintaining an applications datastore 402. The applications datastore 402 includes data structures associated with online applications that are offered by, e.g., a web server. Application installation modules can be stored in the data structures or at a third party site.

In the example of FIG. 4, the flowchart 400 continues to module 404 with maintaining a file types datastore including file types of files that can be handled by the online applications represented in the applications datastore.

In the example of FIG. 4, the flowchart 400 continues to module 406 with receiving a request to open a file having a file type represented in the file types datastore.

In the example of FIG. 4, the flowchart 400 continues to module 408 with determining an application represented in the applications datastore is a default application for handling files of the file type. In a specific implementation, the default application can be a global default for the file type, a group- or demographic-specific default for the file type, or a user-specific default for the file type. One or more of these defaults could instead be used.

In the example of FIG. 4, the flowchart 400 continues to module 410 with launching an instance of the application to handle the file.

In the example of FIG. 4, the flowchart 400 continues to module 412 with instructing a client to launch a browser in association with the instance of the application.

In the example of FIG. 4, the flowchart 400 ends at module 414 with keeping the instance of the application alive until an application-closing stimulus is detected. The application-closing stimulus can include a time-out, an explicit close instruction from the user, or some other application-closing stimulus. Closing the browser may or may not be the application-closing stimulus.

Figure 5:
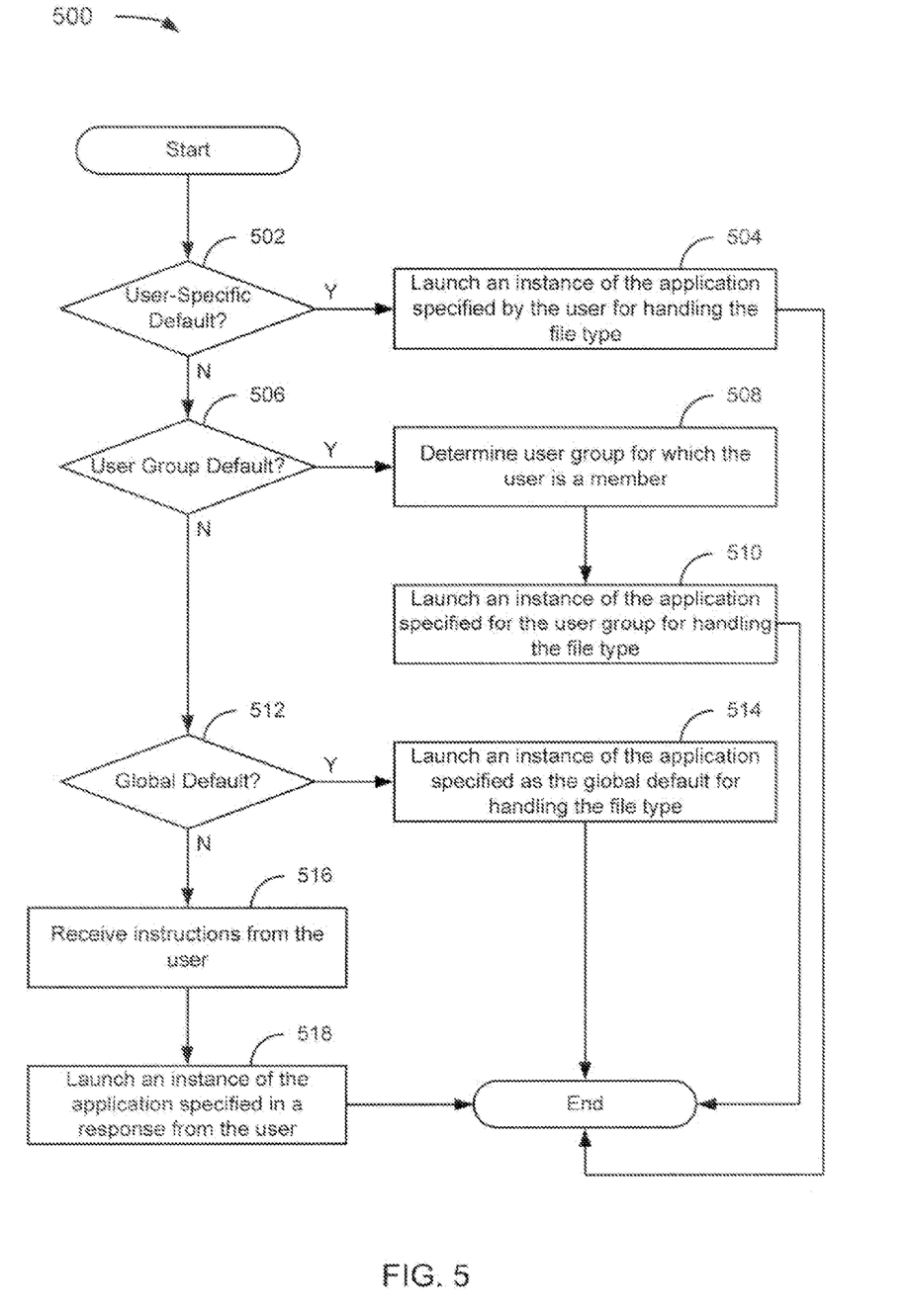
FIG. 5 depicts a flowchart of an example of a method for determining a default application for handling files of a particular file type and launching the default application.

FIG. 5 depicts a flowchart 500 of an example of a method for determining a default application for handling files of a particular file type and launching the default application. The flowchart 500 is intended to illustrate in some more detail an example of a method that can be carried out at modules 408 and 410 of the example of FIG. 4. As such, the flowchart 500 starts with determining a default application for handling files of a given file type ends when an instance of the application is launched.

In the example of FIG. 5, the flowchart 500 starts at decision point 502 with determining whether a file type has a user-specific application default. If it is determined that the file type has a user-specific application default (502-Y), then the flowchart 500 ends at module 504 with launching an instance of the application specified by the user for handling the file type.

If, on the other hand, it is determined that the file type does not have a user-specific application default (502-N), then the flowchart 500 continues to decision point 506 where it is determined whether the file type has a user group-specific application default. If it is determined that the file type has a user group-specific application default (506-Y), then the flowchart 500 continues to module 508 with determining the user group for which the user is a member and ends at module 510 with launching an instance of the application specified for the user group for handling the file type.

If, on the other hand, it is determined that the file type does not have a user group-specific application default (506-N), then the flowchart 500 continues to decision point 512 where it is determined whether the file type has a global application default. If it is determined that the file type has a global application default (512-Y), then the flowchart 500 ends at module 514 with launching an instance of the application specified as the global default for handling the file type.

If, on the other hand, it is determined that the file type does not have a global application default (512-N), then the flowchart 500 continues to module 516 with receiving instructions from the user and ends at module 518 with launching an instance of the application specified in a response from the user.

Figure 6:
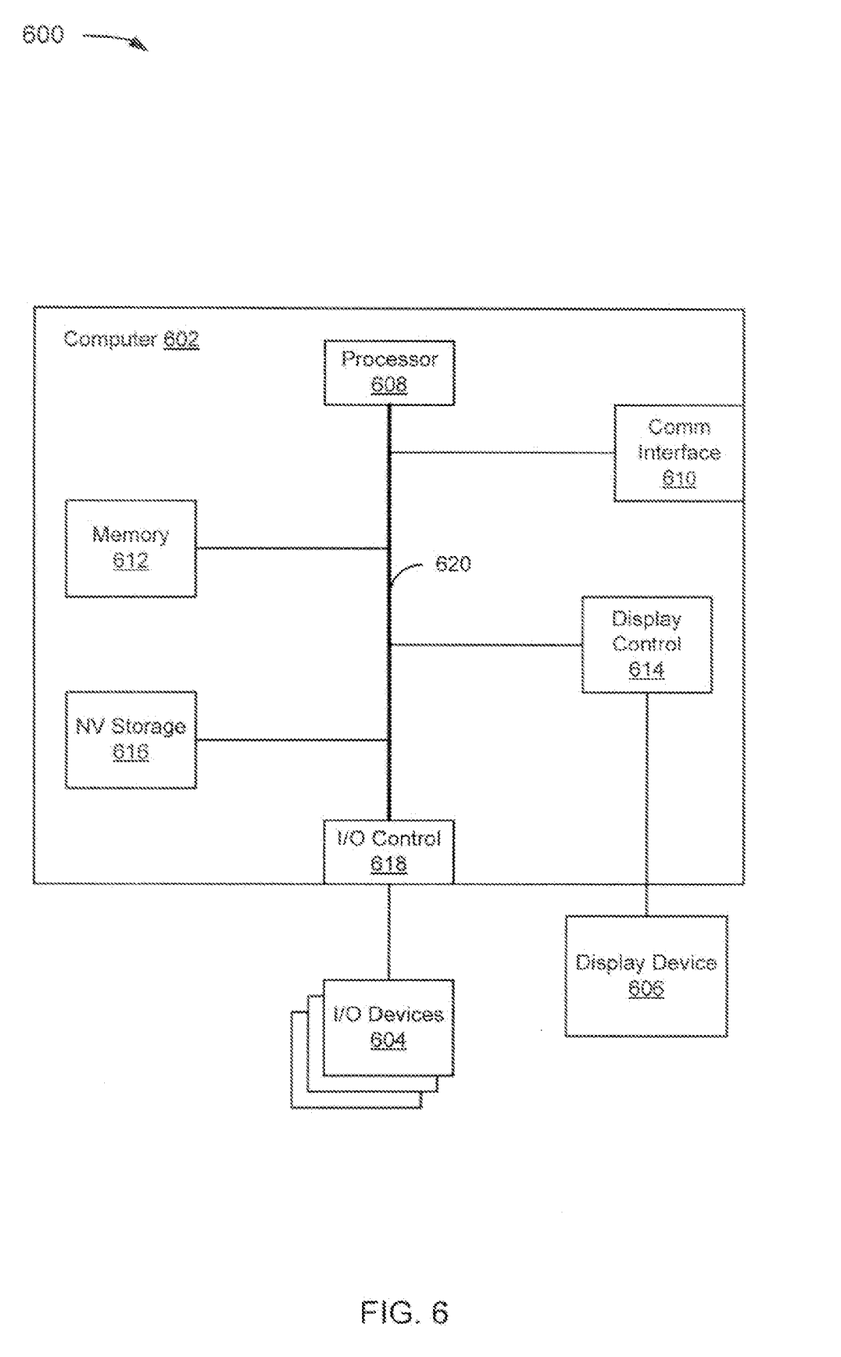
FIG. 6 depicts an example of a system on which techniques described in this paper can be implemented.

FIG. 6 depicts an example of a system on which techniques described in this paper can be implemented. The computer system 600 may be a conventional computer system that can be used as a client computer system, such as a wireless client or a workstation, or a server computer system. The computer system 600 includes a computer 602, I/O devices 604, and a display device 606. The computer 602 includes a processor 608, a communications interface 610, memory 612, display controller 614, non-volatile storage 616, and I/O controller 618. The computer 602 may be coupled to or include the I/O devices 604 and display device 606.

The computer 602 interfaces to external systems through the communications interface 610, which may include a modem or network interface. It will be appreciated that the communications interface 610 can be considered to be part of the computer system 600 or a part of the computer 602. The communications interface 610 can be an analog modem, ISDN modem, cable modem, token ring interface, satellite transmission interface (e.g. "direct PC"), or other interfaces for coupling a computer system to other computer systems.

The processor 608 may be, for example, a conventional microprocessor such as an Intel Pentium microprocessor or Motorola power PC microprocessor. The memory 612 is coupled to the processor 608 by a bus 670. The memory 612 can be Dynamic Random Access Memory (DRAM) and can also include Static RAM (SRAM). The bus 670 couples the processor 608 to the memory 612, also to the non-volatile storage 616, to the display controller 614, and to the I/O controller 618.

The I/O devices 604 can include a keyboard, disk drives, printers, a scanner, and other input and output devices, including a mouse or other pointing device. The display controller 614 may control in the conventional manner a display on the display device 606, which can be, for example, a cathode ray tube (CRT) or liquid crystal display (LCD). The display controller 614 and the I/O controller 618 can be implemented with conventional well known technology.

The non-volatile storage 616 is often a magnetic hard disk, an optical disk, or another form of storage for large amounts of data. Some of this data is often written, by a direct memory access process, into memory 612 during execution of software in the computer 602. One of skill in the art will immediately recognize that the terms "machine-readable medium" or "computer-readable medium" includes any type of storage device that is accessible by the processor 608 and also encompasses a carrier wave that encodes a data signal.

The computer system 600 is one example of many possible computer systems which have different architectures. For example, personal computers based on an Intel microprocessor often have multiple buses, one of which can be an I/O bus for the peripherals and one that directly connects the processor 608 and the memory 612 (often referred to as a memory bus). The buses are connected together through bridge components that perform any necessary translation due to differing bus protocols.

Network computers are another type of computer system that can be used in conjunction with the teachings provided herein. Network computers do not usually include a hard disk or other mass storage, and the executable programs are loaded from a network connection into the memory 612 for execution by the processor 608. A Web TV system, which is known in the art, is also considered to be a computer system, but it may lack some of the features shown in FIG. 6, such as certain input or output devices. A typical computer system will usually include at least a processor, memory, and a bus coupling the memory to the processor.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Techniques described in this paper relate to apparatus for performing the operations. The apparatus can be specially constructed for the required purposes, or it can comprise a general purpose computer selectively activated or reconfigured by a computer program stored in the computer. Such a computer program may be stored in a computer readable storage medium, such as, but is not limited to, read-only memories (ROMs), random access memories (RAMs), EPROMs, EEPROMs, magnetic or optical cards, any type of disk including floppy disks, optical disks, CD-ROMs, and magnetic-optical disks, or any type of media suitable for storing electronic instructions, and each coupled to a computer system bus.

Although the foregoing embodiments have been described in some detail for purposes of clarity of understanding, the invention is not necessarily limited to the details provided.

We claim:

1. A method, comprising:
    receiving first code defining a web page, the code embedded with a link configured to cause a seamless remote online application to access a file;
    modifying the code to include at least one script that, when executed, augments the link to cause the seamless remote online application to retrieve a list of remote online applications capable of handling files having a file type of the file, retrieve seamless remote online access parameters for accessing the file, and access the file, the modifying resulting in a modified code defining a seamless remote online application-enabled web page with the file represented on the web page that the seamless remote online application can access;
    after modifying the code, serving, to a web client, the modified first code defining the seamless remote online application-enabled web page;
    detecting a file access of the file represented on the seamless remote online application-enabled web page, the detection resulting from selection of the link at the web client;
    triggering a seamless remote online application access server to activate an instance of the seamless remote online application to access the file using the list of remote online applications if the remote online access parameters are met.

2. The method of claim 1, further comprising:
    creating a remote online application display web page including output of the seamless remote online application;
    serving the remote online application display web page to the web client.

3. The method of claim 1, wherein the web client is a first web client, further comprising:
    creating a remote online application display web page including output of the seamless remote online application;
    serving the remote online application display web page to a second web client.

4. The method of claim 1, wherein the seamless remote online application-enabled web page is a second web page, further comprising:
    installing a seamless remote online application-enabled web page modification engine;
    modifying a first web page to create the second web page.

5. The method of claim 1, wherein activating the instance of the seamless remote online application includes launching the instance of the seamless remote online application.

6. The method of claim 1, wherein activating the instance of the seamless remote online application includes passing control to the instance of the seamless remote online application.

7. A system comprising:
    a processor;
    a seamless remote online application-enabled web page modification engine;
    a seamless remote online application-enabled web page server engine coupled to the seamless remote online application-enabled web page modification engine;
    a file access detection engine coupled to the seamless remote online application-enabled web page server engine;
    a seamless remote online application launching engine coupled to the file access detection engine;
    wherein, in operation:
        the seamless remote online application-enabled web page modification engine:
            receives first code defining a web page, the code embedded with a link configured to cause a seamless remote online application to access a file;
            causes the processor to modify the code to include at least one script that, when executed, augments the link to cause the seamless remote online application to retrieve a list of remote online applications capable of handling files having a file type of the file, retrieve seamless remote online access parameters for accessing the file, and access the file, the modifying resulting in a modified code defining a seamless remote online application-enabled web page;
        the seamless remote online application-enabled web page server engine serves, to a web client, the modified first code defining the seamless remote online application-enabled web page after the code is modified;
        the file access detection engine detects an attempted file access of the file, the detection resulting from selection of the link at the web client;
        the seamless remote online application launching engine triggers a seamless remote online application access server to launch an instance of the remote online application to access the file using the list of remote online applications if the remote online access parameters are met.

8. The system of claim 7, wherein the web client is a first web client, further comprising:
   a remote online application web page display engine;
   a remote online application display web page datastore coupled to the remote online application web page display engine;
   a remote online application web page server engine coupled to the remote online application display web page datastore;
   wherein, in operation:
      the remote online application web page display engine receives data associated with the execution of the remote online application, provides data for display in a remote online application web page, and stores the remote online application web page in the remote online application display web page datastore;
      the remote online application web page server engine serves the remote online application web page to a second web client.

9. The system of claim 8, wherein the first web client and the second web client are the same web client.

10. The system of claim 8, wherein the first web client and the second web client are different web clients.

11. The system of claim 7, further comprising installing the seamless remote online application-enabled web page modification engine.

12. The system of claim 7, wherein the seamless remote online application launching engine passes control to the instance of the remote online application capable of handling the file.

13. The system of claim 7, wherein the seamless remote online application launching engine activates the instance of the remote online application capable of handling the file.

14. A non-transitory computer readable medium comprising executable instructions, the instructions being executable by a data processing device to perform a method, the method comprising:
   receiving first code defining a web page, the code embedded with a link configured to cause a seamless remote online application to access a file;
   modifying the code to include at least one script that, when executed, augments the link to cause the seamless remote online application to retrieve a list of remote online applications capable of handling files having a file type of the file, retrieve seamless remote online access parameters for accessing the file, and access the file, the modifying resulting in a modified code defining a seamless remote online application-enabled web page with the file represented on the web page that the seamless remote online application can access;
   after modifying the code, serving, to a web client, the modified first code defining the seamless remote online application-enabled web page;
   detecting a file access of the file represented on the seamless remote online application-enabled web page, the detection resulting from selection of the link at the web client;
   triggering a seamless remote online application access server to activate an instance of the seamless remote online application to access the file using the list of remote online applications if the remote online access parameters are met.

15. The non-transitory computer readable medium of claim 14, the method further comprising:
   creating a remote online application display web page including output of the seamless remote online application;
   serving the remote online application display web page to the web client.

16. The non-transitory computer readable medium of claim 14, wherein the web client is a first web client, the method further comprising:
   creating a remote online application display web page including output of the seamless remote online application;
   serving the remote online application display web page to a second web client.

17. The non-transitory computer readable medium of claim 14, wherein the seamless remote online application-enabled web page is a second web page, the method further comprising:
   installing a seamless remote online application-enabled web page modification engine;
   modifying a first web page to create the second web page.

18. The non-transitory computer readable medium of claim 14, wherein activating the instance of the seamless remote online application includes launching the instance of the seamless remote online application.

19. The non-transitory computer readable medium of claim 14, wherein activating the instance of the seamless remote online application includes passing control to the instance of the seamless remote online application.

* * * * *